United States Patent Office
3,711,399
Patented Jan. 16, 1973

3,711,399
SELECTIVE HYDROCRACKING AND ISOMERIZATION OF PARAFFIN HYDROCARBONS
John Harold Estes, Wappingers Falls, Stanley Kravitz, Wiccopee, and Robert M. Suggitt, Wappingers Falls, N.Y., assignors to Texaco Inc., New York, N.Y.
No Drawing. Filed Dec. 24, 1970, Ser. No. 101,445
Int. Cl. C10g 13/10
U.S. Cl. 208—112                                    16 Claims

ABSTRACT OF THE DISCLOSURE

Paraffin hydrocarbons are selectively hydrocracked and isomerized under controlled conversion conditions by contacting the hydrocarbon with hydrogen, a catalyst composed of a fluorided Group VII–B or VIII metal-alumina catalyst and a carbon oxide as a conversion reaction moderator. By employing a fluorided metal-alumina catalyst and a carbon oxide moderator such as carbon monoxide or carbon dioxide, paraffin hydrocarbons are selectively hydrocracked and isomerized in a manner such that selectivity, activity and product distribution is controlled over the course of the conversion reaction.

BACKGROUND OF THE INVENTION

This invention relates to a process for the conversion of paraffin hydrocarbons having at least 6 carbon atoms to more valuable products. In particular, this invention relates to a process for catalytically converting paraffin hydrocarbons under controlled temperature conditions to highly branched hydrocarbon products. In one of its more specific aspects this invention relates to the conversion of paraffin hydrocarbons in the presence of a composite catalyst possessing a hydrogenating component and a cracking component where the selectivity of the process is reversibly controlled through the addition of a moderator during conversion.

Processes for the conversion of paraffin hydrocarbons have been known for many years. A plurality of conversion reactions wherein hydrocarbons are converted to more valuable by-products has been practiced employing a wide variety of catalysts and operating conditions. Well established processes include rearrangement of molecular structure at elevated temperatures by contacting the hydrocarbon with a catalyst and when conducted in the presence of hydrogen have been broadly termed hydroprocesses.

Among the hydroprocesses known to the art is included hydrocracking where a charge stock is contacted with a hydrocracking catalyst at elevated temperatures and pressures in the presence of hydrogen thereby converting the hydrocarbon to lighter products. The catalysts employed in the course of hydrocracking vary in composition but in general contain a cracking component and a hydrogenation component making up the composite material. Such conventional hydrocracking catalysts include a hydrogenating component on a support of the cracking component. The hydrogenating component frequently is a Group VII–B or VIII metal or compound thereof, for example, a metal such as platinum, palladium, rhodium, ruthenium, or rhenium and mixtures thereof. The metal is generally present in an amount of between 0.1 to 5.0 and preferably 0.5 to 2.0 percent by weight of the catalyst. The cracking component may comprise catalysts which ordinarily are used in catalytic cracking units. Such catalysts are generally composed of a mixture of refractory amorphous inorganic oxides such as magnesia, silica, alumina and the like. More recently, crystalline aluminosilicate zeolites such as zeolite X and Y, generally in admixture with other inorganic oxides such as silica-alumina, have been found to be suitable supports for the hydrogenating component especially when they have been subjected to an ion exchange treatment to reduce the alkali metal content of the zeolite or mixture.

By virtue of the composite nature of the catalyst described above, contacting of a paraffin hydrocarbon charge therewith results in a multiplicity of conversion reactions such that the feedstock is converted to lighter materials by the action of cracking and hydrogenation. While cracking and hydrogenation account for the main conversion reactions other mechanisms are also involved but are obscured by virtue of the operating conditions and most importantly as a consequence of the charge being contacted with the catalyst having a plurality of functions.

The consequence flowing from the use of highly active catalyst described above in conversion reactions involving paraffin hydrocarbons having at least 6 carbon atoms has been the lack of control over catalyst activity and selectivity where the desired effect is to optimize a particular set of products from a complex reaction while at the same time avoiding permanent damage to the catalyst in terms of its original selectivity and activity. Heretofore, depending on the end product sought, it was necessary to choose from a large number of catalytic materials that catalyst which provided the best selectivity. Variations in feedstock and alterations in the sought after products brought forth the use of a multiplicity of reactors and catalysts needed to accommodate the plurality of reactions involved.

It is therefore an object of this invention to provide a means for converting paraffin hydrocarbons to preselected products by employing a catalyst having hydrocracking and hydrogenation activity under processing conditions capable of controlling catalyst activity and selectivity.

Another object of this invention is to provide a means for bringing an extraordinary selectivity shift in catalyst behavior.

Another object of this invention is to provide a method for controlling the selectivity of a catalyst employing as a catalytic moderator a material heretofore considered a catalyst poison.

Yet another object of this invention is to provide a method for reversibly controlling the selectivity of a catalytic system and a process employing the same through the addition of a moderator to the paraffin hydrocarbon conversion reaction where the moderator introduces no ability to function normally in the absence thereof.

Other objects and advantages will become apparent from a reading of the following description and examples.

SUMMARY OF THE INVENTION

Broadly, this invention contemplates a hydrocarbon conversion process which comprises contacting a paraffin hydrocarbon containing at least 6 carbon atoms with hydrogen, a catalyst comprising a fluorided Group VII–B or VIII metal-alumina catalyst and a carbon oxide wherein said carbon oxide is introduced to said process at the rate of from about $5 \times 10^{-6}$ to $1 \times 10^{-3}$ gram mole of carbon oxide per hour per gram of said catalyst. Carbon oxides contemplated herein and introduced in the course of the process include carbon monoxide and carbon dioxide and preferably carbon monoxide.

According to our invention, we have found a means for reversibly controlling the selectivity of a paraffin hydrocarbon conversion process through the addition of a carbon oxide as a moderator during the period of reaction. The beneficial effects hereinafter more fully described was unexpected inasmuch as carbon oxides such as carbon monoxide have heretofore been known as catalyst poisons and especially strong deactivators of platinum metal catalysts. Further, not only has the carbon oxide been found to be capable of altering catalyst selectivity and the course of the hydrocarbon conversion reaction but additionally the shift in reaction and selectivity are not only controllable but reversible. Essentially, through the actions of the carbon oxide process moderator in the hydroprocessing reaction, the effect is to permit a fine tuning of the catalytic system to optimize a particular set of products from a complex reaction.

Pursuant to this invention conversion of paraffin hydrocarbons having at least 6 and up to 40 carbon atoms is undertaken at conditions including temperatures from about 400 to 900° F., preferably 450 to 750° F., at liquid hourly space velocities of from about 0.5 to 8.0, preferably 1.0 to 2.0 and hydrogen to hydrocarbon mole ratios in the range of about 0.1:1 to 10:1, preferably 0.5:1 to 5:1.

The catalyst employed in our process is one which comprises a member of Group VII–B or VIII of the Periodic Table, alumina and fluorine and represents a well known class of hydrocracking catalysts. Such a catalyst represents a composite material possessing hydrogenating activity and cracking activity by virtue of its composition. The hydrogenating component corresponds to the Group VII–B or VIII metal present on the cracking support, such as alumina. The catalyst is provided with additional acidity by virtue of the presence of from about 0.5 to 15.0 weight percent chemically combined fluorine. Exemplary of the Group VII–B and VIII metals are rhenium, platinum, palladium, rhodium and ruthenium and the metal is present in amounts ranging from about 0.01 to 5.0 weight percent and preferably from about 0.1 to 2.0 weight percent based on the composite catalyst. Aluminas in various forms may be used as a component of the catalyst and particularly those aluminas having replaceable surface hydroxyl groups and surface areas of from 50 to 800 square meter per gram using the BET method. Included within our definition of alumina we mention for example eta-alumina, gamma-alumina, silica stabilized alumina, i.e., aluminas containing approximately 5 weight percent silica, thoria-alumina, zirconia-alumina and titania-alumina. Preferably, we employ aluminas having surface areas of from 50 to 400 square meters per gram and particularly eta- and gamma-alumina.

The catalyst described above can be prepared by methods known to the art. The Group VII–B or VIII metal as a component of the catalyst can be provided to the alumina by impregnating with a soluble salt of the metal followed by calcination at temperatures of from 600 to 1200° F. for several hours. Additional acidity is introduced to the metal-alumina composite by contacting the composite with a fluoriding agent such as aqueous hydrogen fluoride, vaporized boron or ammonium fluoride or treatment with other well known fluoriding compounds such as carbon tetrafluoride or sulfur tetrafluoride thereby introducing to the catalyst chemically combined fluorine in an amount of from 0.5 to 15.0 weight percent and preferably from 0.5 to 6.0 weight percent.

We have found that the role of our carbon oxide moderator, such as carbon monoxide, in a system composed of a paraffin hydrocarbon feedstock having at least 6 carbon atoms in contact with the aforementioned catalyst and hydrogen is to suppress the cracking aspect of the catalyst, that is to say to interfere with the acidity function of the catalyst surface while at the same time avoiding permanent damage or poisoning of the catalyst. In this regard, we have found that low concentrations of the moderator introduced in the course of converting the paraffin hydrocarbon strongly shifts the product distribution such that the catalyst is moderated to the extent that the cracking propensity of the catalytic material is inhibited and with the higher amounts of the moderator recited herein essentially eliminated. Consequently, the nature of the conversion reaction can be converted from one essentially of hydrocracking a paraffin feedstock to one of selective hydrocracking and/or hydroisomerization. Discontinuation of carbon oxide introduction to the conversion process results in a reversal of catalyst selectivity and redirects the reaction toward the original conditions, that is to say substantial hydrocracking of the feedstock will again occur. As can be seen, the effect of moderator addition is reversible, i.e., diminished or eliminated rates of moderator addition reverse the process from one of hydroisomerization or selective hydrocracking towards hydrocracking.

Extremely low concentrations of carbon oxide introduction during the course of paraffin conversion have been found to perform the function detailed above. The amount of moderator beneficially employed and introduced in the course of the process varies from about $5 \times 10^{-6}$ to $1 \times 10^{-3}$ gram mole of moderator per hour per gram of catalyst and preferably from about $5 \times 10^{-5}$ to $5 \times 10^{-4}$ gram mole of moderator per hour per gram of said catalyst. The preferred carbon oxide moderator employed in our process is carbon monoxide.

In selecting the amount of moderator introduced during conversion, we have found that the rate of carbon oxide introduction is dependent upon the temperature of the reaction such that higher amounts of moderator are required to inhibit hydrocracking at higher temperatures while lesser amounts perform the same function at lower temperatures. That is, amounts such as $5 \times 10^{-5}$ to $1 \times 10^{-4}$ gram mole of moderator per hour per gram of catalyst are sufficient where the process is carried out at temperatures of about 500° F. whereas higher amounts such as $1 \times 10^{-4}$ to $5 \times 10^{-4}$ are needed when processing temperatures are about 700° F. Likewise, carbon oxide introduction and its effect upon the process is responsive to the percent fluorine on the catalyst. A catalyst containing lower amounts of fluorine such as 0.5 weight percent requires less carbon oxide to moderate the reaction whereas fluorine contents of about 6 weight percent require the higher rates of carbon oxide introduction. One convenient means of introducing the moderator to the reaction zone has been to add the moderator to the hydrogen stream prior to hydrogen introduction to the reaction chamber. Moderator introduction can be on a continuus basis or alternatively, the carbon oxide may be pulsed or intermittently introduced to the reaction such that the rate of carbon oxide introduction is within the ranges stated above. An additional factor in selecting the rate of carbon oxide introduction resides in the carbon number of the feedstock, i.e., less carbon oxide is required when the feedstock consists of lower molecular weight paraffins such as hexane or heptane whereas increased amounts of carbon oxide are called for as the molecular weight of the hydrocarbon feed increases as for example where the feedstock is a paraffin wax containing 27 or more carbon atoms.

By providing a means for controlling the activity and selectivity of the process conducted in the presence of the aforementioned catalyst through the use of a carbon oxide moderator a plurality of paraffin hydrocarbons having from 6 to 40 carbon atoms are readily selectively hydrocracked and hydroisomerized to more valuable products. For example, light straight run having an initial boiling point of 70° F. and an end point of about 200° F. containing $C_6$ normal paraffins can be isomerized in the presence of the catalyst and moderator at temperatures of from 450 to 750° F. with minimal cracking such that the selectivity to high octane number blending components is favored, illustrated by yields of branched isomers. Individual $C_7$ to $C_{10}$ paraffins or mixtures of $C_7$ to $C_{10}$ paraffins as found in heavy straight run fractions having initial boiling points of about 200° F. and end points of about 400° F. can be hydroprocessed in the presence of the instant catalyst system and moderator to selectively hydrocrack ad/or isomerize the same to propane, isobutane, isopentane and isohexane fractions at temperatures of from 450 to 750° F. Paraffins having from 11 to 18 carbon atoms and middle distillate fractions having initial boiling points of about 400° F. and end points of about 600° F. containing $C_{11}$ to $C_{18}$ paraffins can be selectively hydrocracked at temperatures of from 450 to 900° F. to provide normal and iso $C_5$–$C_9$ gasoline blending materials. $C_{10}$ to $C_{27}$ paraffins and fuel oils and gas oils having boiling ranges of from 560 to 1000° F. and comprising such materials as waxy vacuum gas oils can be isomerized at temperatures of from 600 to 800° F. to provide yields of middle distillates useful as jet and diesel fuels. In particularly desirable embodiments, paraffinic residual oils, slack waxes and petrolatums are hydroisomerized in the presence of the aforementioned catalyst and moderator to provide greater yields of high viscosity index base oils having lower pour points at temperatures of from 600 to 750° F.

Product selectivity from the conversion reaction can be easily adjusted by varying the introduction rate of carbon oxide to the process such that the higher levels of moderator introduction favor isomerization whereas lower levels favor selective hydrocracking. Hydrogen pressures ranging from 50 to 3000 p.s.i.g. may be employed in the process. One convenient means of introducing the moderator to the reaction zone has been to add the carbon oxide to the hydrogen stream prior to hydrogen introduction into the reaction chamber. Carbon oxide introduction can be used on a continuous basis or alternatively the moderator may be pulsed or intermittently introduced to the reaction such that the average rate of moderator introduction is within $5 \times 10^{-6}$ to $1 \times 10^{-3}$ gram mole of carbon oxide per hour per gram of said catalyst.

In order to more fully illustrate the nature of our invention and manner of practicing the same, the following examples are presented. In these examples, the best mode contemplated by us for carrying out our invention is set forth.

EXAMPLE I

A charge stock consisting of a mixture of $C_{10}$–$C_{14}$ normal paraffins was contacted with a catalyst comprising 0.49 weight percent platinum on alumina fluorided to a 4% level. Conversion conditions included a temperature of 650° F., 500 p.s.i.g. of hydrogen flowing at the rate of 3 cubic feet per hour, a catalyst charge of 84 grams and the charge stock was introduced at the rate of 100 cc. per hour or a space velocity of 1.0. The initial charge stock was analyzed and found to be free of branch chain paraffins and had the following distribution of normal paraffins: $C_{10}$ 9.0 weight percent, $C_{11}$ 31.6 weight percent, $C_{12}$ 28.8 weight percent, $C_{13}$ 23.7 weight percent and $C_{14}$ 6.7 weight percent. An initial conversion reaction was undertaken to determine how the catalyst converted the charge stock to cracked products in the absence of the moderator carbon monoxide. Samples were collected at 6 hour intervals and each sample was analyzed by gas chromotography to give the following product distribution on a weight percent basis.

TABLE I

| Period: | Time period/hours | Cracked | Isomerized | Unchanged |
|---|---|---|---|---|
| 1 | 0–6 | 93.6 | 2.6 | 3.8 |
| 2 | 12–18 | 93.8 | 2.2 | 4.0 |
| 3 | 24–30 | 99.0 | 0.3 | 0.7 |
| 4 | 36–42 | 98.5 | 0.5 | 1.0 |
| 5 | 48–54 | 96.5 | 1.7 | 1.8 |
| 6 | 60–66 | 92.0 | 3.0 | 5.0 |
| 7 | 72–78 | 85.6 | 5.5 | 8.9 |
| 8 | 84–90 | 88.2 | 4.5 | 7.3 |
| 9 | 96–102 | 87.2 | 4.9 | 7.9 |
| 10 | 108–114 | 87.8 | 4.7 | 7.5 |
| 11 | 120–126 | 77.3 | 8.9 | 13.8 |
| 12 | 132–138 | 84.0 | 6.1 | 9.9 |
| 13 | 144–150 | 81.2 | 8.2 | 10.6 |

As noted from Table I, catalyst deactivation is demonstrated by the decrease in cracking activity with time on stream. The catalyst and conditions employed produced a typical hydrocracking system where the feed was hydrocracked to predominantly gaseous products lighter than pentane with a high proportion of isobutane along with very low total isomer yield.

In a manner similar to that described above, the same feedstock was contacted with the catalyst and in this instance in the presence of carbon monoxide and Table II shows the effect of moderator introduction and the reversible effect of the moderator upon the system, i.e., the hydrocracking activity of the catalyst is sensitive to carbon monoxide concentration in a reversible manner. During this run carbon monoxide was admitted into the system for specific periods as shown in Table II. The level of carbon monoxide introduced was $2.5 \times 10^{-4}$ gram mole per hour per gram of catalyst. The periods, product distribution on a weight percent basis and points at which carbon monoxide was admitted are shown in Table II below.

TABLE II

| Period: | CO introduced | Time period/hours | Cracked | Isomerized | Unchanged |
|---|---|---|---|---|---|
| 1 | No | 0–6 | 99.7 | | 0.3 |
| 2 | No | 6–12 | 99.9 | | 0.1 |
| 3 | Yes | 12–18 | 22.1 | 29.4 | 48.6 |
| 4 | Yes | 18–24 | 1.8 | 27.7 | 70.5 |
| 5 | No | 24–30 | 5.6 | 34.6 | 59.8 |
| 6 | No | 30–36 | 12.5 | 39.6 | 47.9 |
| 7 | Yes | 36–42 | 4.0 | 30.2 | 65.8 |
| 8 | Yes | 42–48 | 1.3 | 27.5 | 71.2 |
| 9 | No | 48–54 | 5.7 | 35.5 | 58.8 |
| 10 | No | 54–60 | 23.6 | 44.7 | 31.7 |
| 11 | Yes | 60–66 | 3.7 | 28.3 | 68.0 |
| 12 | Yes | 66–72 | 1.2 | 27.3 | 71.5 |
| 13 | Yes | 72–78 | 1.7 | 29.3 | 69.0 |
| 14 | Yes | 78–84 | 5.7 | 26.4 | 67.9 |
| 15 | Yes | 84–90 | 1.1 | 25.6 | 73.3 |
| 16 | Yes | 90–96 | 1.1 | 26.6 | 72.4 |
| 17 | Yes | 96–102 | 1.1 | 26.2 | 72.7 |
| 18 | Yes | 102–108 | 1.5 | 27.7 | 70.8 |
| 19 | Yes | 108–114 | 1.6 | 28.4 | 70.0 |
| 20 | Yes | 114–120 | 1.0 | 25.4 | 73.6 |
| 21 | Yes | 120–126 | 0.8 | 21.5 | 77.7 |
| 22 | No | 126–132 | 3.2 | 30.9 | 65.9 |
| 23 | No | 132–138 | 5.9 | 36.3 | 57.8 |
| 24 | No | 138–144 | 9.4 | 39.2 | 51.4 |
| 25 | Yes | 144–150 | 3.0 | 28.2 | 68.8 |
| 26 | Yes | 150–156 | 0.8 | 23.6 | 75.6 |

As can be seen from Table II introduction of carbon monoxide in the course of conversion has an extraordinary effect on catalyst selectivity. By virtue of the presence of carbon monoxide during conversion, isomerization is permitted to function at reasonable levels. Moreover, the effect is reversible such that when carbon monoxide introduction is terminated, the cracking activity of the catalyst gradually returns to its original level.

High level resolution analysis of the products after period 8 and 24 showed the samples to consist of the following:

|  | 8 | 24 |
|---|---|---|
| Percent: | | |
| Cracked below $C_{10}$ | 1.1 | 7.5 |
| Isomerized $C_{10}$-$C_{14}$ | 33.2 | 56.3 |
| Normal $C_{10}$-$C_{14}$ | 63.8 | 35.8 |
| Totals | 98.1 | 99.6 |

The analysis demonstrates the far reaching effect of carbon monoxide on the process. The process employing a catalyst initially converting the normal paraffin charge stock to products comprising 99.7% cracked material was moderated to alter its selectivity to yield approximately 1.1% cracked product while exhibiting 33.2% isomerization.

EXAMPLE II

A charge stock consisting of a mixture of $C_{10}$-$C_{14}$ normal paraffins was contacted with a catalyst comprising 0.49 weight percent platinum on alumina fluorided to a 4 percent level. Conversion conditions included a temperature of 650° F., 500 p.s.i.g. of hydrogen flowing at the rate of 3 cubic feet per hour, a catalyst charge of 85 grams where the charge stock was introduced at the rate of 100 cc. per hour or a space velocity of 1. Initial conversion of the feedstock for a 12 hour period was undertaken in the absence of carbon monoxide. Thereafter, throughout further 12 hour periods carbon monoxide was introduced, the rate of introduction during each successive period being greater than the preceding one. Table III summarizes the product distribution on a weight percent basis as related to the amount of carbon monoxide introduced during conversion expressed in gram mole of moderator per hour per gram of catalyst.

TABLE III

| Time | Carbon monoxide level | Cracked <$C_{10}$ | Isomerized $C_{10}$-$C_{14}$ | Unchanged |
|---|---|---|---|---|
| 12th hour | 0 | 96.3 | 1.2 | 2.5 |
| 24th hour | 7.8×10⁻⁵ | 15.7 | 50.4 | 34.0 |
| 36th hour | 1.5×10⁻⁴ | 2.4 | 32.0 | 65.6 |
| 48th hour | 2.3×10⁻⁴ | 0.5 | 21.1 | 78.4 |

The data in Table III shows that low levels of carbon monoxide moderate activity to give some cracking with a high degree of conversion to isomerized products. As the level of carbon monoxide increased, the overall selectivity of the process improved virtually suppressing cracking activity.

EXAMPLE III

A slack wax charge stock having a melting point of 127.2° F., a gravity of 39.9 API, an n-paraffin content of 59.0 weight percent and an oil content of 11.8 weight percent, the oil in the wax stock having a pour point of 25° F., an API gravity of 30.3, a viscosity index of 103 and a paraffin content of 27.0 volume percent was contacted with a catalyst comprising 0.5 weight percent platinum on alumina fluorided to a 4 percent level. Conversion conditions included a temperature of 650° F., 500 p.s.i.g. of hydrogen, a catalyst charge of 240 grams and the charge stock introduced at the rate of 600 cc. per hour or a liquid hourly space velocity of 2. Table IV summarizes the results after contacting the feedstock in the absence and presence of various levels of the moderator carbon monoxide. Time periods, product distribution on a weight percent basis and times at which carbon monoxide was admitted are shown in Table IV.

TABLE IV

| Time | Gm. mole CO/hr./gm. catalyst | Cracked products | Isomerized oil | Selectivity |
|---|---|---|---|---|
| 24th hour | 0 | 75.1 | 17.2 | 0.06 |
| 38th hour | 1×10⁻⁴ | 54.6 | 25.0 | 0.19 |
| 56th hour | 1.7×10⁻⁴ | 25.8 | 31.9 | 0.43 |
| 68th hour | 3.3×10⁻⁴ | 22.0 | 30.0 | 0.45 |

From Table IV it will be seen that the introduction of low levels of carbon monoxide reduced the cracking losses from 75% progressively downward to about 22%. Simultaneously the yield of high viscosity index oil was increased from about 17 percent through approximately 28 to 30 weight percent basis the original charge. The pour point of the dewaxed oil products after conversion in the presence of the catalyst and moderator ranged from −5 to −10° F., the gravity API range from 39.9 to 41.6 and the viscosity index ranged from 123 to 147.

EXAMPLE IV

A hydrotreated residual oil having a melting point of 134° F., an average molecular weight of 534 and a viscosity index of 98 was contacted with a catalyst comprising 0.47 weight percent platinum on fluorided alumina. Conversion conditions of temperature, pressure, space velocity and hydrogen introduction rate are summarized in Table V below. As can be seen from the table, the selectivity of the process conducted in the presence of the aforementioned catalyst and the moderator carbon monoxide demonstrated a reduction in cracking and greater yields of high viscosity index base oils.

TABLE V

| List of physical measurements | Charge stock | Run A | Run B | Run C |
|---|---|---|---|---|
| CO level, gm. mole/hr./gm. catalyst | | 0 | 0 | 1.2×10⁻⁴ |
| Temperature, ° F | | 600 | 670 | 726 |
| Pressure, p.s.i.g | | 2,000 | 2,000 | 2,000 |
| LHSV, v./hr./v | | 0.58 | 0.52 | 0.54 |
| $H_2$ rate, s.c.f./barrel | | 4,110 | 4,590 | 4,750 |
| Waxy oil yield, vol. percent | | 73.4 | 15.1 | 84.5 |
| Waxy oil tests: | | | | |
| Kinetic viscosity, cs. at 210° F | 15.15 | 7.10 | 5.77 | 8.74 |
| Viscosity index | 98 | 97 | 101 | 121 |
| Molecular weight | 534 | 409 | 400 | 474 |
| Melting point, ° F | 134.0 | | | 107.6 |
| Stabilized oil yield, vol percent basis | 10 | 65.8 | 12.5 | 79.7 |

The stabilized oil yield is a cut obtained by distillation at 5 mm. Hg and discarding the fraction distilling at 308° F. and lower.

The base runs A and B absent carbon oxide introduction were obtained over a catalyst containing 2.5 weight percent fluorine on a platinized (0.47 weight percent) alumina base. In run C the fluorine level of the catalyst was 4 weight percent. Lower levels of fluorine results in a catalyst having lower activity. However, from run B above, the catalyst demonstrated extensive cracking activity resulting in a yield of 12.5 volume percent stabilized oil. Other properties such as molecular weight and kinetic viscosity show that extensive cracking had occurred. The use of small amounts of carbon monoxide introduced to the conversion process led to the results tabulated in run C and provided a substantial increase in the yield of stabilized oil. The characteristics of the oil indicated that it had been successfully hydroisomerized without undue cracking. The lower kinetic viscosity and the lowered melting point are improved features of the processed oil.

EXAMPLE V

A charge stock consisting of a mixture of $C_{10}$-$C_{14}$ normal paraffins was contacted with a catalyst comprising 0.49 weight percent platinum on eta alumina fluorided to a 4 weight percent level. Conversion conditions included a temperature of 650° F., 500 p.s.i.g. of hydrogen flowing at the rate of 3 cubic feet per hour, a catalyst charge of 83 grams with the charge introduced at the rate of 100 cc. per hour or a space velocity of one. Initial conversion of the feedstock for a twelve hour period was undertaken in the absence of carbon dioxide to provide base line activity. During the following twelve hour period carbon dioxide was introduced at the rate of 1.5×10⁻⁴ gram mole per hour per gram of catalyst. Conversion was continued for the next twelve hours in the absence of carbon dioxide introduction. For the subsequent twenty-four hour period carbon dioxide was again fed at the rate of $1.5 \times 10^{-4}$ gram mole per hour per gram of catalyst. Over the final forty-eight hour period conversion was conducted in the absence of carbon dioxide introduction. Table VI summarizes the product distribution on a weight percent basis as related to the amount of carbon dioxide introduced during each successive period of conversion. From the table it will be seen that carbon dioxide moderated the conversion reaction by increasing the selectivity of the process to isomerized products. By interrupting carbon dioxide introduction the catalyst regains its higher hydrocracking activity thereby demonstrating that the moderating effect is not permanent.

TABLE VI

| Time | Carbon dioxide level | Cracked $C^{10}$ | Isomerized $C^{10}-C^{14}$ | Unchanged |
|---|---|---|---|---|
| 12th hour | 0 | 97.7 | 1.0 | 1.3 |
| 24th hour | $1.5 \times 10^{-4}$ | 1.8 | 29.5 | 70.5 |
| 36th hour | 0 | 25.2 | 54.0 | 20.8 |
| 60th hour | $1.5 \times 10^{-4}$ | 0.3 | 16.4 | 83.6 |
| 108th hour | 0 | 13.2 | 44.3 | 42.5 |

We claim:

1. A hydrocarbon conversion process which comprises contacting a paraffin hydrocarbon containing at least 6 carbon atoms with hydrogen, a catalyst comprising a fluorided Group VII-B or VIII metal-alumina catalyst and a carbon oxide, wherein said metal is selected from the group consisting of platinum, palladium, rhodium, ruthenium and rhenium and comprises from about 0.01 to 5.0 weight percent of said catalyst, wherein said carbon oxide is introduced to said process at the rate of from about $5 \times 10^{-6}$ to $1 \times 10^{-3}$ gram mole of carbon oxide per hour per gram of said catalyst.

2. A process according to claim 1 wherein said contacting is conducted at a temperature of from 400 to 900° F.

3. A process according to claim 1 wherein said contacting is conducted at a temperature of from 450 to 750° F.

4. A process according to claim 1 wherein said carbon oxide is introduced at the rate of from about $5 \times 10^{-5}$ to $5 \times 10^{-4}$ gram mole of carbon oxide per hour per gram of said catalyst.

5. A process according to claim 1 wherein said carbon oxide is carbon monoxide.

6. A process according to claim 1 wherein said carbon oxide is carbon dioxide.

7. A process according to claim 1 wherein said contacting is conducted at a liquid hourly space velocity of from 0.5 to 8.0.

8. A process according to claim 1 wherein said contacting is conducted at a hydrogen pressure of from 50 to 3000 p.s.i.g.

9. A process according to claim 1 wherein said catalyst comprises from about 0.5 to 15.0 weight percent fluorine.

10. A process according to claim 1 wherein said catalyst comprising from about 0.5 to 6.0 weight percent fluorine.

11. A process according to claim 1 wherein said Group VIII metal is platinum.

12. A process according to claim 1 wherein said contacting includes a hydrogen to hydrocarbon mole ratio of about 0.1:1 to 10:1.

13. A process according to claim 1 wherein said hydrocarbon has from 6 to 40 carbon atoms.

14. A process according to claim 1 wherein said hydrocarbon is a mixture of $C_{10}$ to $C_{14}$ paraffins.

15. A process according to claim 1 wherein said hydrocarbon is a residual oil.

16. A process according to claim 1 wherein said hydrocarbon is a slack wax.

References Cited

UNITED STATES PATENTS 3,531,396   9/1970   Messing et al. _____ 208—111

JAMES E. POER, Primary Examiner

P. F. SHAVER, Assistant Examiner

U.S. Cl. X.R.

208—111